United States Patent
Dangy-Caye et al.

(10) Patent No.: US 10,079,618 B2
(45) Date of Patent: Sep. 18, 2018

(54) METHOD FOR MANAGING INTERFERENCE

(71) Applicant: SAGEMCOM BROADBAND SAS, Rueil Malmaison (FR)

(72) Inventors: Nicolas Dangy-Caye, Rueil Malmaison (FR); Laurent Tricaud, Rueil Malmaison (FR); Massinissa Lalam, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 15/543,273

(22) PCT Filed: Jan. 15, 2016

(86) PCT No.: PCT/EP2016/050711
§ 371 (c)(1),
(2) Date: Jul. 13, 2017

(87) PCT Pub. No.: WO2016/113370
PCT Pub. Date: Jul. 21, 2016

(65) Prior Publication Data
US 2018/0026675 A1    Jan. 25, 2018

(30) Foreign Application Priority Data
Jan. 16, 2015 (FR) .................. 15 50350

(51) Int. Cl.
*H04B 1/715* (2011.01)
*H04W 84/12* (2009.01)
(Continued)

(52) U.S. Cl.
CPC ............ *H04B 1/715* (2013.01); *H04B 1/692* (2013.01); *H04B 2001/7154* (2013.01); *H04W 4/80* (2018.02); *H04W 84/12* (2013.01)

(58) Field of Classification Search
CPC ............ H04B 1/692; H04B 1/715; H04B 2001/7154; H04L 63/0492; H04W 4/80;
(Continued)

(56) References Cited

U.S. PATENT DOCUMENTS

2007/0224936 A1* 9/2007 Desai .................. H04W 52/242
455/41.2
2009/0143056 A1 6/2009 Tang et al.

FOREIGN PATENT DOCUMENTS

EP    1 838 040    9/2007

OTHER PUBLICATIONS

International Search Report and Written Opinion of the ISA for PCT/EP2016/050711, dated Mar. 22, 2016, 9 pages.
(Continued)

*Primary Examiner* — David S Huang
(74) *Attorney, Agent, or Firm* — Nixon & Vanderhye P.C.

(57) ABSTRACT

The invention relates to a method for managing the interference generated by the simultaneous operation of a wireless network using frequency-hopping spread spectrum and a wireless network using a spread spectrum technique, in which a set-top box has a wireless network using frequency-hopping spread spectrum and is connected to a residential gateway having a wireless network using frequency-hopping spread spectrum and a wireless network using a spread spectrum technique and in which, if the residential gateway and the set-top box are close, the residential gateway (E40) relays the data between the set-top box and the peripherals connected to the wireless network of the set-top box and the set-top box interrupts the operation of its wireless network using frequency-hopping spread spectrum.

10 Claims, 4 Drawing Sheets

(51) Int. Cl.
  *H04B 1/692* (2011.01)
  *H04W 4/80* (2018.01)
(58) Field of Classification Search
  CPC .. H04W 52/0212; H04W 88/06; H04W 88/08
  See application file for complete search history.

(56) References Cited

OTHER PUBLICATIONS

Translation of the Written Opinion of the ISA for PCT/EP2016/050711, dated Jul. 27, 2017.

\* cited by examiner

METHOD FOR MANAGING INTERFERENCE

This application is the U.S. national phase of International Application No. PCT/EP2016/050711 filed 15 Jan. 2016, which designated the U.S. and claims priority to FR Patent Application No. 15/50350 filed 16 Jan. 2015, the entire contents of each of which are hereby incorporated by reference.

The present invention relates to a method, a device and a system for managing interference generated by the simultaneous operation of a wireless network using frequency-hopping spread spectrum and a wireless network using a spread spectrum technique.

The coexistence of wireless communication systems using conjointly the Bluetooth and 2.4 GHz Wi-Fi standards is a problem that has been known for a long time. This is because radio transmission based on a spread spectrum by the two standards in the same ISM frequency band at 2.4 GHz poses problems of interference.

Thus a transmission for the Bluetooth standard by frequency-hopping spread spectrum (FHSS) is perceived as noise for a 2.4 GHz Wi-Fi receiver. The Wi-Fi standard operated in the 2.4 GHz band uses a direct sequence spread spectrum (DSSS) technique and an orthogonal frequency division multiplexing method.

Likewise, a transmission according the 2.4 GHz Wi-Fi standard is perceived as noise for a Bluetooth receiver.

Solutions currently exist for overcoming this problem, in particular when these two technologies are integrated in the same device. These solutions are for example based on a temporal and/or frequency and/or spatial isolation of the radio signals emitted according to the various standards. These solutions are however not suitable for systems comprising two physically separate devices that may be distant from one another to a greater or lesser extent and because of the absence of a possibility of "real-time" coordination available in this case.

The aim of the present invention is to solve the drawbacks of the prior art by proposing a method, device and system for managing interference generated by the simultaneous operation of a wireless network using frequency-hopping spread spectrum and a wireless network using a spread spectrum technique by two physically separate devices close to each other.

To this end, according to a first aspect, the invention proposes a method for managing interference generated by the simultaneous operation of a wireless network using frequency-hopping spread spectrum and a wireless network using a spread spectrum technique, a set-top box having a wireless network using frequency-hopping spread spectrum and being connected to a residential gateway having a wireless network using frequency-hopping spread spectrum and a wireless network using a spread spectrum technique and being able to reduce the interference generated by the simultaneous operation of a wireless network using frequency-hopping spread spectrum and a wireless network using a spread spectrum technique, characterised in that the method comprises the steps of:

transferring the parameters used in the wireless network using the frequency-hopping spread spectrum of the residential gateway to the set-top box with an time offset for an application, by the set-top box, of the transferred parameters and of the time offset, in the wireless network using the frequency-hopping spread spectrum of the set-top box, determining whether the set-top box and the residential gateway are close to each other and, in the affirmative:

receiving, by the residential gateway, of the profiles of the peripherals connected to the wireless network using the frequency-hopping spread spectrum of the set-top box, transferring, by the residential gateway to the set-top box, of a command of temporal correction request, relaying, by the residential gateway, of the information exchanged between the set-top box and the peripherals connected to the wireless network using the frequency-hopping spread spectrum of the set-top box before the deactivation of the wireless network using the frequency-hopping spread spectrum of the set-top box.

The invention also relates to a device for managing interference generated by the simultaneous operation of a wireless network using frequency-hopping spread spectrum and a wireless network using a spread spectrum technique, a set-top box having a wireless network using frequency-hopping spread spectrum and being connected to a residential gateway having a wireless network using frequency-hopping spread spectrum and a wireless network using a spread spectrum technique and being able to reduce the interference generated by the simultaneous operation of a wireless network using frequency-hopping spread spectrum and a wireless network using a spread spectrum technique, characterised in that the device is included in the residential gateway and comprises:

means for transferring parameters used in the wireless network using the frequency-hopping spread spectrum of the residential gateway to the set-top box together with a time for an application, by the set-top box, of the transferred parameters and of the time offset, in the wireless network using the frequency-hopping spread spectrum of the set-top box, means for determining whether the set-top box and the residential gateway are close to each other and, in the affirmative:

means for receiving, by the residential gateway, the profiles of the peripherals connected to the wireless network using the frequency-hopping spread spectrum of the set-top box, means for transferring, by the residential gateway to the set-top box, of a temporal correction request command, means for the relaying, by the residential gateway, of the information exchanged between the set-top box and the peripherals connected to the wireless network using the frequency-hopping spread spectrum of the set-top box before the deactivation of the wireless network using the frequency-hopping spread spectrum of the set-top box.

The invention also relates to a system for managing interference generated by the simultaneous operation of a wireless network using frequency-hopping spread spectrum and a wireless network using a spread spectrum technique, a set-top box having a wireless network using frequency-hopping spread spectrum and being connected to a residential gateway having a wireless network using frequency-hopping spread spectrum and a wireless network using a spread spectrum technique and being able to reduce the interference generated by the simultaneous operation of a wireless network using frequency-hopping spread spectrum and a wireless network using a spread spectrum technique, characterised in that the system comprises:

means for transfer of the parameters used in the wireless network using the frequency-hopping spread spectrum of the residential gateway to the set-top box with an time offset for an application, by the set-top box, of the transferred parameters and of the time offset, in the wireless network using the frequency-hopping spread spectrum of the set-top box, means for determining whether the set-top box and the residential gateway are close to each other and, in the affirmative:

means for the receiving, by the residential gateway, the profiles of the peripherals connected to the wireless network using the frequency-hopping spread spectrum of the set-top box, means for the transferring, by the residential gateway to the set-top box, a temporal correction request, means for the transfer, by the set-top box, of information indicating, to the peripherals connected to the wireless network using the frequency-hopping spread spectrum of the set-top box, an application of time offset in the wireless network using the frequency-hopping spread spectrum of the set-top box, means for applying the parameters and the time offset in the wireless network of the set-top box using frequency-hopping spread spectrum, means for deactivating the wireless network using the frequency-hopping spread spectrum of the set-top box, means for relaying, by the residential gateway, of the information exchanged between the set-top box and the peripherals connected to the wireless network using the frequency-hopping spread spectrum of the set-top box before the deactivation of the wireless network using the frequency-hopping spread spectrum of the set-top box.

Thus the gateway is able to reduce the interference generated by the simultaneous functioning of a wireless network using frequency-hopping spread spectrum and a wireless network using a spread spectrum technique of two physically separate devices connected to each other.

According to a particular embodiment of the invention, the method further comprises the steps of:

transferring, by the set-top box, of information indicating to the peripherals connected to the wireless network using the frequency-hopping spread spectrum of the set-top box of an application of time offset in the wireless network using the frequency-hopping spread spectrum of the set-top box, applying the parameters and of the time offset in the wireless network of the set-top box using frequency-hopping spread spectrum, deactivating the wireless network using the frequency-hopping spread spectrum of the set-top box.

Thus the peripherals connected to the wireless network using the frequency-hopping spread spectrum of the set-top box pass without interruption and without any association procedure from the wireless network using the frequency-hopping spread spectrum of the set-top box to the wireless network using the frequency-hopping spread spectrum of the residential gateway.

According to a particular embodiment of the invention, the determination whether the set-top box and the residential gateway are close to each other is done by detecting the power of the radio signals received from the set-top box and/or by an estimation of the length of a cable connecting the set-top box and the residential gateway and/or by an attempt at connection to the network of the set-top box using signals at a power below a nominal power.

Thus the peripherals connected to the wireless network using the frequency-hopping spread spectrum of the set-top box pass reliably, without interruption and without any association procedure, from the wireless network using the frequency-hopping spread spectrum of the set-top box to the wireless network using the frequency-hopping spread spectrum of the residential gateway.

According to a particular embodiment of the invention, the method is executed with a periodicity that depends on the result of previous determinations of the proximity of the set-top box and residential gateway.

Thus, if the proximity detection is negative a certain consecutive number of times, it is then possible to increase the frequency of initiation of the detection. On the other hand, if the positions of the set-top box and residential gateway are stable over time, the frequency of initiation of detection is reduced.

According to a particular embodiment of the invention, the method further comprises the steps of:

qualifying the connection between the residential gateway and the set-top box, taking into account the qualification for the relay, through the qualified connection, by the residential gateway, of the information exchanged between the set-top box and the peripherals connected to the wireless network using the frequency-hopping spread spectrum of the set-top box before deactivating the wireless network using the frequency-hopping spread spectrum of the set-top box.

Thus the delay related to the connection and the time necessary for functioning in relay mode are compensated.

According to a particular embodiment of the invention, the wireless networks using frequency-hopping spread spectrum are s of Bluetooth type networks and the wireless network using a spread spectrum technique is a Wi-Fi or IEEE 802.11 network 802.11 type.

According to a particular embodiment of the invention, the method is executed periodically and the set-top box and residential gateway are no longer close, and the method further comprises the steps of:

determining the peripherals that must belong to the pico network of the set-top box, transferring to the set-top box the profiles of each peripheral that must belong to the pico network of the set-top box with the parameters used in the wireless network using the frequency-hopping spread spectrum of the residential gateway, transferring, by the residential gateway to the set-top box, of a command temporal correction request command.

The invention also relates to the computer programs stored on an information carrier, said programs containing instructions for implementing the previously described methods, when they are loaded in and executed by a computer system.

The characteristics of the invention mentioned above, as well as others, will emerge more clearly from a reading of the following description of an example embodiment, said description being given in relation to the accompanying drawings, among which:

The set-top box STB is a device able to decode audiovisual programmes and transfer them to one or more audiovisual devices such as a television or an audio reproduction system. The audiovisual programmes are for example received from the residential gateway RGW.

Figure 1:
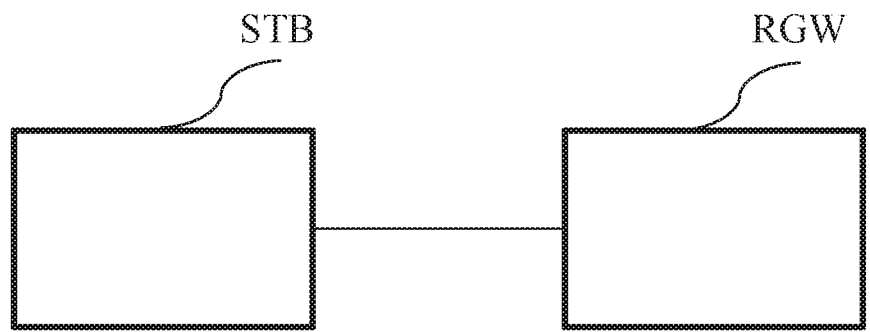
FIG. 1 shows a residential system comprising a set-top box and a gateway in which the present invention is implemented.

A plurality of Bluetooth peripherals, not shown in FIG. 1, may be connected to the set-top box STB. The Bluetooth peripherals may be connected in order to form a network known as pico network with the set-top box STB acting as the master. The peripherals may simultaneously function as slave peripherals. At a maximum, eight active Bluetooth peripherals can participate in a pico network. The time is divided into intervals of 625 µs in the pico network. The master and slaves can alternate the transmissions according to the time distribution mode. The master peripheral manages the Bluetooth communication links and procedures with the slaves in the pico network. A slave can be activated to transmit only after having been interrogated by the master.

The set-top box STB comprises a Bluetooth communication interface and at least one interface for communicating with the gateway RGW, which may be of the 5 GHz Wi-Fi and/or Ethernet type for example.

The gateway RGW provides the exchanges with one or more external communication networks. These networks deliver audiovisual programmes, provide the telephone communications, and the providing of internet services. Other Bluetooth peripherals, not shown in FIG. 1, may be connected to form a pico network with the gateway RGW.

The gateway RGW and the set-top box STB may or may not be placed alongside each other. Very often the gateway RGW is disposed in the vicinity of a connection to the external network or networks and the set-top box STB is very often placed in the vicinity of the audiovisual device or devices.

The gateway RGW comprises a Bluetooth communication interface, a 2.4 GHz Wi-Fi communication interface, and at least one interface for communicating with the set-top box STB, which is GHz Wi-Fi type and/or an Ethernet for example.

Depending on the proximity of the gateway RGW and the set-top box STB, interference between the Bluetooth and 2.4 GHz Wi-Fi communications can be attenuated according to the present invention.

According to the present invention, the residential gateway RGW:
  transfers parameters used in the wireless network using the frequency-hopping spread spectrum of the residential gateway to the set-top box with a time offset for an application, by the set-top box, of the transferred parameters and of the time offset, in the wireless network using the frequency-hopping spread spectrum of the set-top box,
  determines whether the set-top box and residential gateway are close to each other and, in the affirmative:
  receives profiles of the peripherals connected to the wireless network using the frequency-hopping spread spectrum of the set-top box,
  transfers, by the residential gateway to the set-top box, a time correction request command,
  relays the information exchanged between the set-top box and the peripherals connected to the wireless network using the frequency-hopping spread spectrum of the set-top box before deactivating the wireless network using the frequency-hopping spread spectrum of the set box top.

Figure 2:
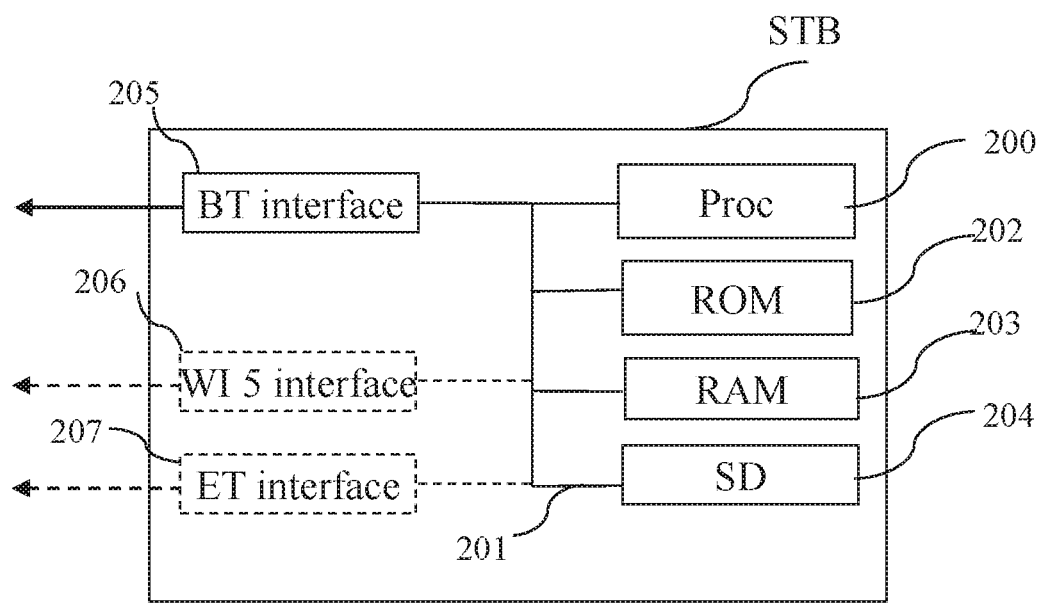
FIG. 2 shows a set-top box according to the present invention.

FIG. 2 shows a set-top box according to the present invention.

The set-top box STB comprises:
  a processor, microprocessor or microcontroller 200;
  a volatile memory 203;
  a non-volatile memory 202;
  optionally a storage medium reader 204, such as an SD card (secure digital card) reader or a hard disk for storing the documents processed by the present invention;
  a Bluetooth BT interface 205,
  an interface WI 5 206 in accordance with the 5 GHz Wi-Fi standard, or an interface ET 207 of Ethernet type,
  a communication bus 201 connecting the processor 200 to the ROM memory 203, to the RAM memory 203, to the storage medium reader 204 and to the interface 205 and to the interfaces 206 or 207.

The processor 200 is capable of executing instructions loaded into the volatile memory 203 from the non-volatile memory 202, from an external memory (not shown), from a storage medium, such as an SD card or the like, or from a communication network. When the set-top box STB is powered up, the processor 200 is capable of reading instructions from the volatile memory 203 and executing them. These instructions form a computer program that causes the implementation, by the processor 200, of all or part of the method described in relation to FIG. 5.

Figure 5:
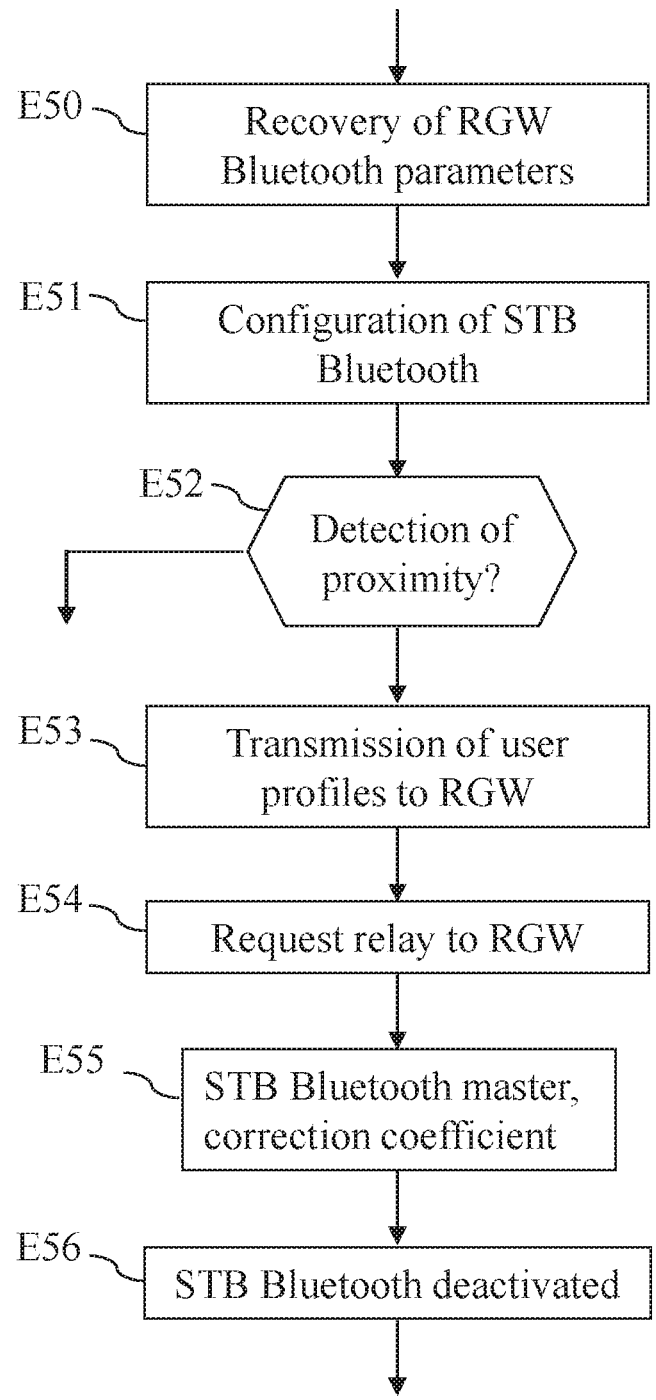
FIG. 5 shows an example of an algorithm, executed by the set-top box, for reducing the interference related to the transmission of data over wireless connections in accordance with the Bluetooth and 2.4 GHz Wi-Fi standards.

All or part of the method described in relation to FIG. 5 may be implemented in software form by the execution of a set of instructions by a programmable machine such as a DSP (digital signal processor) or a microcontroller or be implemented in hardware form by a machine or a dedicated component such as an FPGA (field-programmable gate array) or an ASIC (application-specific integrated circuit).

Figure 3:
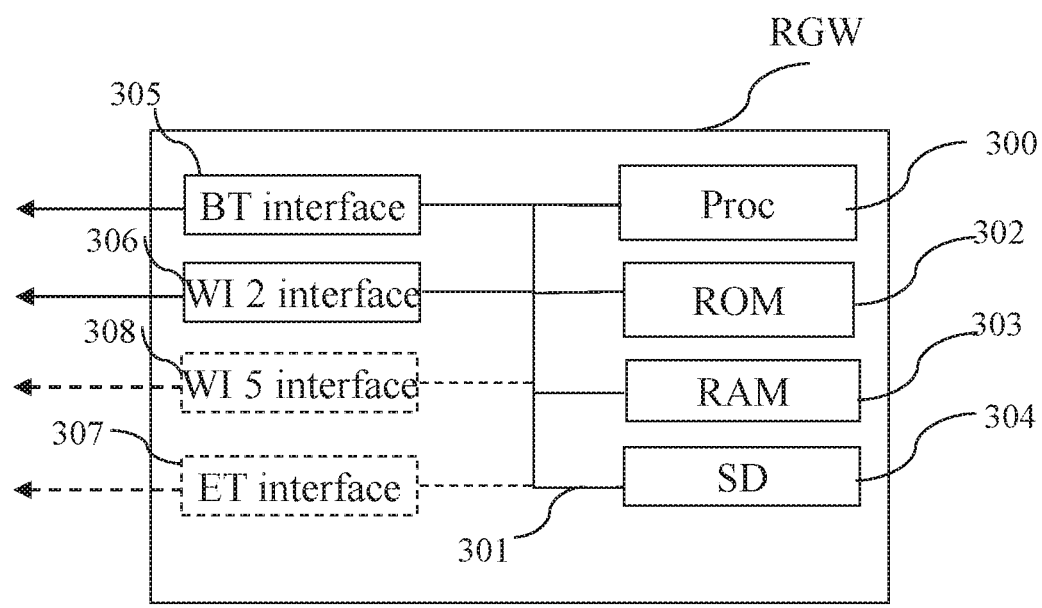
FIG. 3 shows a residential gateway according to the present invention.

FIG. 3 shows a residential gateway according to the present invention.

The residential gateway RGW comprises:
  a processor, microprocessor or microcontroller 300;
  a volatile memory 303;
  a non-volatile memory 302;
  optionally a storage medium reader 304, such as an SD card (secure digital card) reader or a hard disk for storing the documents processed by the present invention;
  a Bluetooth interface BT 305,
  an interface WI 5306 in accordance with the 5 GHz Wi-Fi standard,
  an interface ET 307 of the Ethernet type,
  a communication bus 301 connecting the processor 300 to the ROM memory 303, to the RAM memory 303, to the storage medium reader 304 and to the interfaces 303 or 308.

The processor 300 is capable of executing instructions loaded into the volatile memory 303 from the non-volatile memory 302, from an external memory (not shown), from a storage medium, such as an SD card or the like, or a communication network. When the gateway RGW is powered up, the processor 300 is capable of reading instructions from the volatile memory 303 and executing them. These instructions form a computer program that causes the implementation, by the processor 300, of all or part of the method described in relation to FIG. 4.

Figure 4:
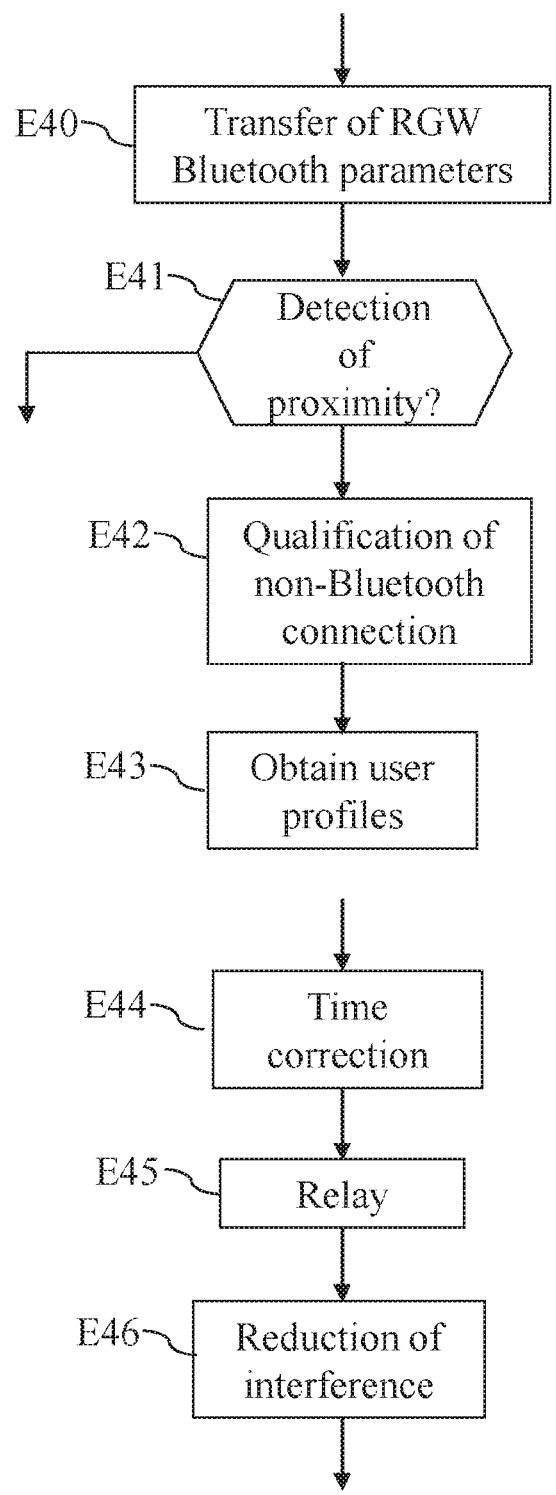
FIG. 4 shows an example of an algorithm, executed by the residential gateway, for reducing interference related to the transmission of data on wireless connections in accordance with the Bluetooth and 2.4 GHz Wi-Fi standards.

All or part of the method described in relation to FIG. 4 may be implemented in software form by the execution of a set of instructions by a programmable machine such as a DSP (digital signal processor) or a microcontroller or be implemented in hardware form by a machine or a dedicated component such as an FPGA (field-programmable gate array) or an ASIC (application-specific integrated circuit).

FIG. 4 shows an example of an algorithm, executed by the residential gateway, for reducing interference related to the transmission of data over wireless connections in accordance with the Bluetooth and 2.4 GHz Wi-Fi standards.

More precisely, the present algorithm is executed by the processor 300 of the residential gateway RGW in collaboration with the processor 200 of the set-top box STB through the interfaces ET 307 and ET 207 and/or interfaces WI 5 308 and 208.

The present algorithm is executed each time the gateway RGW and/or the set-top box STB is powered up and/or each time the interfaces ET 307 and/or ET 207 and/or WI 5 208 are reinitialised. The steps of the present algorithm, from the proximity detection (threshold), are also performed periodically. It should be noted that the periodicity of the execution of the present algorithm may be variable and depends for example on previous variations or not according to the results the proximity detection of the residential gateway RGW to the set-top box STB.

At step E40, the processor 300 demands the transfer of the parameters that will be used by the Bluetooth interface BT 205 in the Bluetooth pico network of the set-top box STB. The transfer is provided by interface ET 307 or WI 5 308. The BT interface 205 of the set-top box STB is then not active.

The Bluetooth protocol uses frequency hopping for communicating in the 2.4 GHz ISM band with a scheme of the master/slave type. The Bluetooth protocol divides the 2.4 GHz ISM band into 79 communication frequencies or channels. Every time interval of 625 µs, the communication channel changes pseudorandomly among these 79 channels or at a minimum among 20 channels in the case of adaptive frequency hopping AFH. The sequence of these frequency hops is essentially derived from the address of the master equipment and its clock. The clock is composed of the internal clock of the RGW gateway and a correction coefficient that only the master is enabled to modify.

The useful values allow generation of the frequency hops identical to those of the RGW gateway and are transferred to the set-top box STB. For example, the useful values are the address of the master equipment of the pico network of the residential gateway RGW, its internal clock and the correction coefficient.

An additional coefficient (time_coex_offset) is also transferred by the gateway RGW to the set-top box STB. This coefficient will have to be added to the clock of the interface BT 205 of the set-top box STB.

The additional coefficient is chosen so that, in communication, the frequency hops of the interface BT 205 of the set-top box and of the interface BT 305 of the gateway RGW are the same but time offset by at least N≥5 slots (5×625 µs=3.125 ms).

It should be noted here that the value of N is chosen so as to be greater than the maximum duration of the Bluetooth transmission of a packet, which is five intervals of time. The frequency used during the first interval of time is kept for the following intervals of time and less than N. The following frequency hops then resume next as if they had actually taken place during the transmission.

Thus, if the frequency f(k) is used at time t by the BT interface 305 of the residential gateway RGW, the same frequency f(k) will be used at the time t+N*625 µs by the interface BT 205 of the set-top box STB.

It should be noted that, in a variant, this step is not executed. According to this variant, the processor 200 of the set-top box STB configures the Bluetooth interface BT 205 as a slave of the Bluetooth pico network of which the residential gateway RGW is the master and obtains the parameters used by the Bluetooth interface 305 BT of the residential gateway RGW in the Bluetooth pico network of which the residential gateway RGW is the master.

It should be noted here that the residential gateway and the set-top box then have the same sequence of frequency hops, by means of a time offset. The residential gateway and the set-top box can then keep their own network identity.

The BT interface 205 of the set-top box STB can then be activated as the master of the Bluetooth pico network of the set-top box STB and can then accept the addition of peripherals and manage their communications.

At step E41, the processor 300 demands an operation of evaluation of the proximity of the residential gateway RGW to the set-top box STB.

For example, the processor 300 instructs the interface BT 305, or even interface WI 5 308, to measure the power of the radio signals received from the residential set-top box STB. Knowing the power emitted by a reference sensor or pilot signal, the measurement of the power of the signal received, the processor 300 evaluates the attenuation between the residential gateway RGW and the set-top box STB.

For example, the processor 300 orders the interface ET 307 to activate means for estimating the length of the cable connecting the set-top box STB and the residential gateway RGW. The means for estimating the length of the cable are conventionally used for purposes of diagnosing a faulty cable or for purposes of transmission power adaptation.

For example, the processor 300 requests the interface BT 305 to make a wireless connection attempt to one of the wireless interfaces of the set-top box STB with a signal having a transmission power less than the one conventionally used.

For example, the processor 300 requests the interface BT 305 to connect to the pico network of the set-top box STB as a slave, requests the interface WI 2306 to generate a signal and requests the interface BT 305 to measure the actual quality of the Bluetooth BT connection according to a load of the Wi-Fi 2.4 GHz interface.

For example, the processor 300 requests the processor 200 to determine whether the signals sent by the interface BT 205 of the set-top box interfere with the signals sent by the WI interface 306 of the residential gateway RGW.

For example, if the processor 300 has requested the interface BT 305, or even the interface WI 5308, to measure the power of the radio signals received from the set-top box STB and if an attenuation of the reference sensor or pilot signal is lower than a predetermined value, for example 20 dB, the processor 300 decides that the residential gateway RGW and the set-top box STB are close and moves to step E42.

For example, if the processor 300 has requested the interface ET 307 to activate means for estimating the length of the cable connecting the set-top box STB and the residential gateway RGW and the cable has a length less than a predetermined value, for example one meter, the processor 300 decides that the residential gateway RGW and the set-top box STB are close and moves to step E42.

For example, if the processor 300 has requested the interface BT 305 to make a wireless connection attempt to one of the wireless interfaces of the set-top box STB with a signal having a transmission power lower than a predetermined value, for example 20 dB lower than the one conventionally used, the processor 300 decides that the residential gateway RGW and the set-top box STB are close and moves to step E42.

For example, if the processor 300 has requested the interface WI 2 306 to generate a signal and the interface BT 305 to connected to the pico network of the set-top box STB as a slave and the measurement of the actual quality of the Bluetooth connection is higher than a predetermined threshold, for example the power of the signal is higher than −50 dBm, the processor 300 decides that the residential gateway RGW and the set-top box STB are close and moves to step E42.

If not, the processor 300 decides that the residential gateway RGW and the set-top box STB are not close and interrupts the present algorithm.

At the following step E42, the processor 300, by means of the interface WI 5308 or the interface ET 307, qualifies the performances of the connection between the residential gateway RGW and the set-top box STB. The processor 300 obtains for example the delay, the jitter and the errors. It should be noted here that this step is optional or is before the triggering of the present algorithm.

At step E43, the processor 300 obtains the profiles of each peripheral belonging to the pico network of the set-top box STB by means of the connection between the residential gateway RGW and the set-top box STB. The processor 300 obtains the profiles and pairing information of the peripherals belonging to the pico network of the set-top box STB. It should be noted that this step may in a variant be performed along with the belonging of new peripherals to the pico network of the set-top box STB.

At step E44, the processor 300 demands the transfer to the set-top box STB of a time correction request of the BT interface 205 by a time correction factor −time_coex_offset, the correction having to be completed at a given instant that can be predetermined, for example of a few seconds after the sending of said time correction request, or used as parameters of said time correction request time_shift_instant.

The time correction can be done either directly using for example the procedure as described in section § 8.6.10.2 (Coarse Clock Adjustment Recover Mode) or in a graduated manner using the method as described in section § 8.6.10.3 (Clock Dragging) of the Bluetooth specifications ("Specification of the Bluetooth® system", vol; 2: Core System Package [BR/EDR Controller volume]", Part B, version 4.1, Dec. 3, 2013). This is because the aforementioned procedures guarantee that the peripherals belonging to the pico network of the set-top box STB will not need to be re-paired once the time correction is completed. At the instant of the end of the time correction, the frequency hops of the BT interface 205 of the set-top box STB and of the BT interface 305 of the residential gateway RGW are aligned.

It should be noted here that, after the time correction, the interface BT 305 of the residential gateway RGW responds as if it was the interface BT 205 of the set-top box STB to any message intended for the pico network of the set-top box STB.

At the following step E45, which takes place at the end of the time correction, the interface BT 205 of the set-top box is deactivated and the processor 300 requests the interface BT 305 and the interface used for the connection with the set-top box to relay the information exchanged between the peripherals previously belonging to the pico network of the set-top box STB and the box STB. It should be noted here that, in transferring the information exchanged, account is taken of the latency relating to the redirection of the information exchanged and according to the profile of the sending or receiving peripheral.

At step E46, the processor 300 instructs the interface BT 305 and interface WI 2 306 to proceed with a reduction in real time of the interference between the Wi-Fi and Bluetooth communications. For example a time and/or frequency and/or spatial isolation is effected.

It should be noted here that the evaluation and decision on the proximity of the residential gateway RGW to the set-top box STB are done by the processor 300 of the residential gateway RGW at step E41. In a variant, the evaluation and the decision on the proximity of the residential gateway RGW to the set-top box STB are done by the processor 200 of the set-top box STB.

FIG. 5 shows an example of an algorithm, executed by the set-top box, for reducing interference relating to the transmission of data over the wireless connections in accordance with the Bluetooth and 2.4 GHz Wi-Fi standards.

More precisely, the present algorithm is executed by the processor 200 of the set-top box STB in collaboration with the processor 300 of the set-top box RGW through the interfaces ET 307 and 207 and/or interfaces WI 5 308 and 208.

The present algorithm is implemented each time the set-top box STB is powered up and/or whenever the interface ET 307 and/or interface ET 207 and/or interface WI 5 308 and/or interface WI 208 are reinitialised. The steps of the present algorithm, from the detection of proximity, are also performed periodically. It should be noted that the periodicity of the execution of the present algorithm may be variable and depend for example on previous variations or not according to the results of evaluation of the proximity of the residential gateway RGW to the set-top box STB.

At step E50, the processor 200 requests the recovery, by means of the interface ET 207 or interface WI 5 206, of the parameters that would be used by the interface BT 205 of the set-top box STB. These parameters must allow a generation of frequency hops identical to those of the RGW gateway.

It should be noted that, as a variant, the processor 200 configures the Bluetooth interface BT 205 as a slave of the Bluetooth pico network of which the residential gateway RGW is the master and obtains the means for identically generating the frequency hops used by the Bluetooth interface BT 305 of the residential gateway RGW in the Bluetooth pico network of which the residential gateway RGW is the master.

At step E51, the processor 200 configures the Bluetooth interface BT 205 as master of the pico network of the set-top box STB using the same frequency hops as those used in the pico network or the RGW, but time offset by an additional coefficient (time_coex_offset).

The additional coefficient is chosen so that, in communication, the frequency hops of the interface BT 205 of the set-top box and of the interface BT 305 of the RGW gateway are the same but time offset by at least N≥5 slots (5×625 µs=3.125 ms).

It should be noted here that the residential gateway and the set-top box then have the same sequence of frequency hops, by means of a time offset. The residential gateway and the set-top box can then keep their own network identity.

If the evaluation and the decision on the proximity of the residential gateway RGW to the set-top box STB are done by the residential gateway RGW, the processor 200 moves from step E51 to E53 if the result of the proximity detection value RGW is positive. In the case where the evaluation and decision on the proximity of the residential gateway RGW to the set-top box STB are done by the set-top box STB, the processor 200 moves from step E51 to E52.

At step E52, the processor 200 evaluates and decides on the proximity of the residential gateway RGW to the set-top box STB in the same way as the one described at step E41 of FIG. 4. In the case of a positive proximity detection, the processor 200 moves from step E52 to E53.

At step E53, the processor 200 commands the transfer of the profiles of each periphery belonging to the pico network of the set-top box STB to the residential gateway RGW through the connection between the residential gateway RGW and the set-top box STB. The processor 200 transfers the profiles and the pairing information of the peripherals belonging to the pico network of the set-top box STB. It should be noted that this step may, in a variant, be performed as new peripherals come to belong to the pico network of the set-top box STB.

At step E54, the processor 200 sends a relay request to the residential gateway RGW indicating to it that the interface BT 305 of the residential gateway will have to take over the relay of the interface BT 205 of the set-top box STB. This information allows the determination of a given instant (time_shift_instant) as from which the interface BT 305 of the residential gateway must respond as if it was the interface BT 205 of the set-top box STB to any message intended for the pico network of the set-top box STB. This instant may be either predefined, for example a few seconds after the sending of said request, or be included in said request.

At the following step E55, the processor 200 demands the transfer, through the interface BT 205, of information indicating to the peripherals connected to the wireless network using the frequency-hopping spread spectrum of the set-top box STB that a time shift will take place in the sequence of the frequency hops, so that, at the given instant time_shift_instant, the time shift effected in the frequency hop will be −time_coex_offset.

It should be noted here that, after the time shift, the residential gateway RGW responds as if it was the set-top box STB to any message intended for the STB.

At the following step E56, the BT interface 205 of the set-top box STB is deactivated and the processor 200 controls the interface used for the connection with the residential gateway RGW for relaying the information exchanged between the peripherals previously belonging to the pico network of the set-top box STB and the set-top box STB. It should be noted here that, in transferring the information exchanged, account is taken of the latency related to the redirection of the information exchanged by the connection between the residential gateway RGW and the set-top box STB, the performance of which can be qualified in the same way as at step E42 and according to the profile of the sending or receiving peripheral.

It should be noted here that, when the BT interface 205 of the set-top box STB is deactivated and the set-top box STB is restarted, the BT interface 205 is reactivated as master of a pico network using the parameters obtained at step E51. The profiles and pairing information on the peripherals newly included in the pico network, including the Bluetooth interface 305 of the residential gateway RGW, are transferred to the set-top box STB.

This information makes it possible to identify the type of peripheral the purpose of which was to be associated with the pico network of which the set-top box STB was the master at step 53.

It should be noted here that, the algorithm in FIG. 4 or FIG. 5 is iterated, the processor 300 or respectively 200 determines, at step E41 or respectively E52, that the set-top box STB and the residential gateway RGW are no longer close, that is to say the BT interface 205 of the set-top box STB is deactivated, the processor 300 of the residential gateway RGW or respectively 200 of the set-top box STB commands the transfer of the profiles of each peripheral that appears to it to legitimately belong to the pico network of the set-top box STB by means of the connection between the residential gateway RGW and the set-top box STB. From the information, the processor 300 identifies the various types of equipment and determines whether their purpose is to be associated with the pico network of the set-top box STB.

It should be noted that this step may, in a variant, be performed as new peripherals come to belong to the pico network of the residential gateway.

The processor 300 or respectively 200 transfers a command to the set-top box requesting it to activate the interface BT 205 of the set-top box STB with the parameters obtained during step E40 or respectively E50, at an instant time_unshift_instant.

The processor 300 commands then the peripherals communicating with the interface BT 305 but thinking that they are on the pico network of the set-top box STB a request for time-correction by a factor −time_coex_offset that will be effective at the instant time_unshift_instant so that said peripherals are recovered by the interface BT 205 of the set-top box STB when the latter is reactivated.

The invention claimed is:

1. A method for managing interference generated by the simultaneous operation of a wireless network using frequency-hopping spread spectrum and a wireless network using a spread spectrum technique, a set-top box having a wireless network using frequency-hopping spread spectrum and being connected to a residential gateway having a wireless network using frequency-hopping spread spectrum and a wireless network using a spread spectrum technique and being able to reduce the interference generated by the simultaneous operation of a wireless network using frequency-hopping spread spectrum and a wireless network using a spread spectrum technique, wherein the method comprises the steps of:

transferring parameters used in the wireless network using the frequency-hopping spread spectrum of the residential gateway to the set-top box with an time offset for an application, by the set-top box, of the transferred parameters and of the time offset, in the wireless network using the frequency-hopping spread spectrum of the set-top box, determining whether the set-top box and the residential gateway are close to each other and, in the affirmative:

receiving, by the residential gateway, of the profiles of the peripherals connected to the wireless network using the frequency-hopping spread spectrum of the set-top box, transferring, by the residential gateway to the set-top box, of a command of temporal correction request, relaying, by the residential gateway, of the information exchanged between the set-top box and the peripherals connected to the wireless network using the frequency-hopping spread spectrum of the set-top box before the deactivation of the wireless network using the frequency-hopping spread spectrum of the set-top box.

2. The method according to claim 1, wherein the method further comprises the steps of:

transferring, by the set-top box, of information indicating to the peripherals connected to the wireless network using the frequency-hopping spread spectrum of the set-top box of an application of the time offset in the wireless network using the frequency-hopping spread spectrum of the set-top box,
applying the parameters and of the time offset in the wireless network of the set-top box using frequency-hopping spread spectrum,
deactivating the wireless network using the frequency-hopping spread spectrum of the set-top box.

3. The method according to claim 1, wherein the determination whether the set-top box and the residential gateway are close to each other is done by detecting the power of the radio signals received from the set-top box and/or by an estimation of the length of a cable connecting the set-top box and the residential gateway and/or by an attempt at connection to the network of the set-top box using signals at a power below a nominal power.

4. The method according to claim 1, wherein the method is executed with a periodicity that depends on the result of the previous determinations of the proximity of the set-top box and residential gateway.

5. The method according to claim 1, wherein the method further comprises the steps of:
qualifying the connection between the residential gateway and the set-top box,
taking into account the qualification for the relay, through the qualified connection, by the residential gateway, of the information exchanged between the set-top box and the peripherals connected to the wireless network using the frequency-hopping spread spectrum of the set-top box before deactivating the wireless network using the frequency-hopping spread spectrum of the set-top box.

6. The method according to claim 1, wherein the wireless networks using frequency-hopping spread spectrum are Bluetooth type networks and the wireless network using a spread spectrum technique is a Wi-Fi or IEEE 802.11 network 802.11 type.

7. The method according to claim 1, wherein the method is executed periodically and the set-top box and residential gateway are no longer close, and the method further comprises the steps of:
determining the peripherals that must belong to the pico network of the set-top box,
transferring to the set-top box the profiles of each peripheral that must belong to the pico network of the set-top box with the parameters used in the wireless network using the frequency-hopping spread spectrum of the residential gateway,
transferring, by the residential gateway to the set-top box, of a command temporal correction request command.

8. A device for managing interference generated by the simultaneous operation of a wireless network using frequency-hopping spread spectrum and a wireless network using a spread spectrum technique, a set-top box having a wireless network using frequency-hopping spread spectrum and being connected to a residential gateway having a wireless network using frequency-hopping spread spectrum and a wireless network using a spread spectrum technique and being able to reduce the interference generated by the simultaneous operation of a wireless network using frequency-hopping spread spectrum and a wireless network using a spread spectrum technique, wherein the device is included in the residential gateway and comprises:
means for transferring parameters used in the wireless network using the frequency-hopping spread spectrum of the residential gateway to the set-top box together with a time offset for an application, by the set-top box, of the transferred parameters and of the time offset, in the wireless network using the frequency-hopping spread spectrum of the set-top box,
means for determining whether the set-top box and the residential gateway are close to each other and, in the affirmative:
means for receiving, by the residential gateway, the profiles of the peripherals connected to the wireless network using the frequency-hopping spread spectrum of the set-top box,
means for transferring, by the residential gateway to the set-top box, of a temporal correction request command,
means for the relaying, by the residential gateway, of the information exchanged between the set-top box and the peripherals connected to the wireless network using the frequency-hopping spread spectrum of the set-top box before the deactivation of the wireless network using the frequency-hopping spread spectrum of the set-top box.

9. A system for managing interference generated by the simultaneous operation of a wireless network using frequency-hopping spread spectrum and a wireless network using a spread spectrum technique, a set-top box having a wireless network using frequency-hopping spread spectrum and being connected to a residential gateway having a wireless network using frequency-hopping spread spectrum and a wireless network using a spread spectrum technique and being able to reduce the interference generated by the simultaneous operation of a wireless network using frequency-hopping spread spectrum and a wireless network using a spread spectrum technique, wherein the system comprises:
means for transfer of the parameters used in the wireless network using the frequency-hopping spread spectrum of the residential gateway to the set-top box with an time offset for an application, by the set-top box, of the transferred parameters and of the time offset, in the wireless network using the frequency-hopping spread spectrum of the set-top box,
means for determining whether the set-top box and the residential gateway are close to each other and, in the affirmative:
means for the receiving, by the residential gateway, the profiles of the peripherals connected to the wireless network using the frequency-hopping spread spectrum of the set-top box,
means for the transferring, by the residential gateway to the set-top box, a temporal correction request,
means for the transfer, by the set-top box, of information indicating, to the peripherals connected to the wireless network using the frequency-hopping spread spectrum of the set-top box, an application of the time offset in the wireless network using the frequency-hopping spread spectrum of the set-top box,
means for applying the parameters and the time offset in the wireless network of the set-top box using frequency-hopping spread spectrum,
means for deactivating the wireless network using the frequency-hopping spread spectrum of the set-top box,
means for relaying, by the residential gateway, of the information exchanged between the set-top box and the peripherals connected to the wireless network using the frequency-hopping spread spectrum of the set-top box before the deactivation of the wireless network using the frequency-hopping spread spectrum of the set-top box.

10. A non-transitory storage medium storing a computer program comprising
   instructions for the implementation, by a system, of the method according to claim 1 when said
   computer program is executed by a processor of said system.

\* \* \* \* \*